(12) United States Patent
Leidy et al.

(10) Patent No.: US 6,622,526 B1
(45) Date of Patent: *Sep. 23, 2003

(54) MULTIPLE ORIFICE GLASS FEED SYSTEM

(75) Inventors: D. Wayne Leidy, Perrysburg, OH (US); Frank J. DiFrank, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/901,481

(22) Filed: Jul. 9, 2001

Related U.S. Application Data

(62) Division of application No. 09/199,771, filed on Nov. 25, 1998, now Pat. No. 6,272,885, which is a continuation of application No. 08/597,760, filed on Feb. 7, 1996, now Pat. No. 5,885,317, which is a continuation-in-part of application No. 08/228,916, filed on Apr. 18, 1994, now abandoned, which is a continuation of application No. 08/022,242, filed on Feb. 25, 1993, now abandoned.

(51) Int. Cl.[7] .................................................. C03B 5/26
(52) U.S. Cl. .............................. 65/328; 65/330; 65/331
(58) Field of Search ........................ 65/126, 328, 330, 65/331

(56) References Cited

U.S. PATENT DOCUMENTS

| | | | | |
|---|---|---|---|---|
| 1,926,764 A | * | 9/1933 | Dorman | 65/328 |
| 4,551,163 A | * | 11/1985 | Duga et al. | 65/129 |
| 5,885,317 A | * | 3/1999 | Leidy et al. | 65/328 |

* cited by examiner

*Primary Examiner*—John Hoffmann

(57) ABSTRACT

A multiple orifice glass feed system for use with a glass forehearth including a plurality of closely spaced plungers, each of which is individually supported independently of each other. Each plunger includes a servo controlled linear actuator and an arm extending between each plunger and its respective servo-motor. Each servo-motor has an axis parallel to the axis of the plungers. An air spring is associated with each plunger for balancing the weight of each plunger and its respective arm. The center lines of the plungers lie generally in a plane. The arms have the major portions thereof generally parallel and closely spaced. A feedback system is provided to monitor the position of each individual needle independently of the other at all times and make corrections to the actual position of the needle if desired.

16 Claims, 14 Drawing Sheets

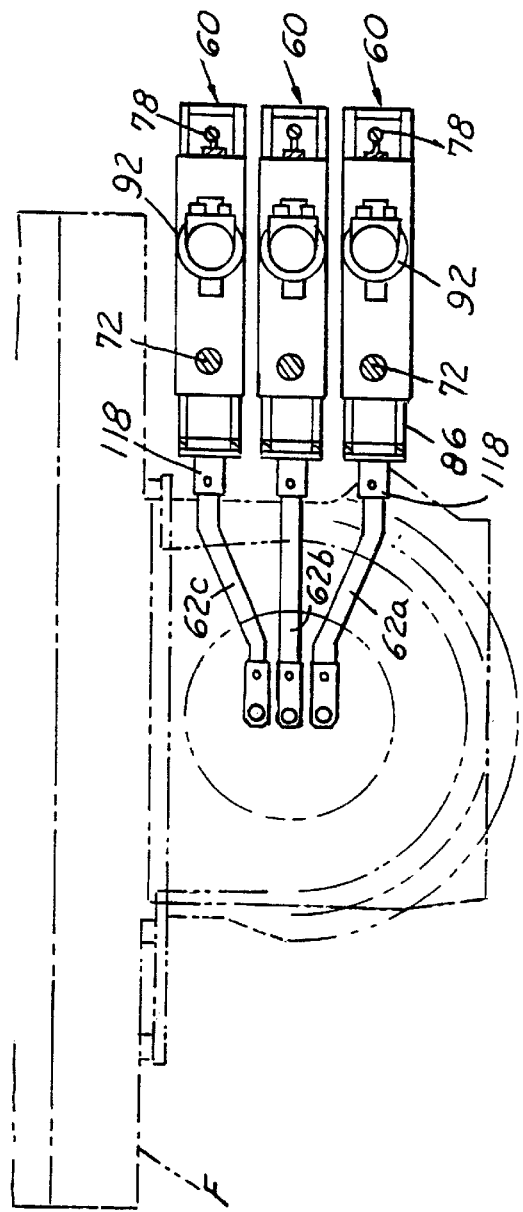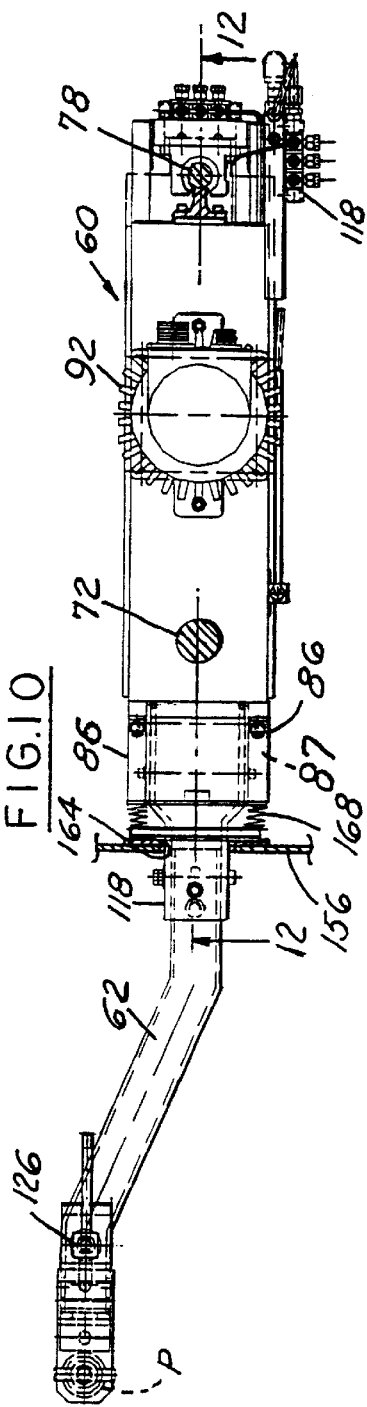

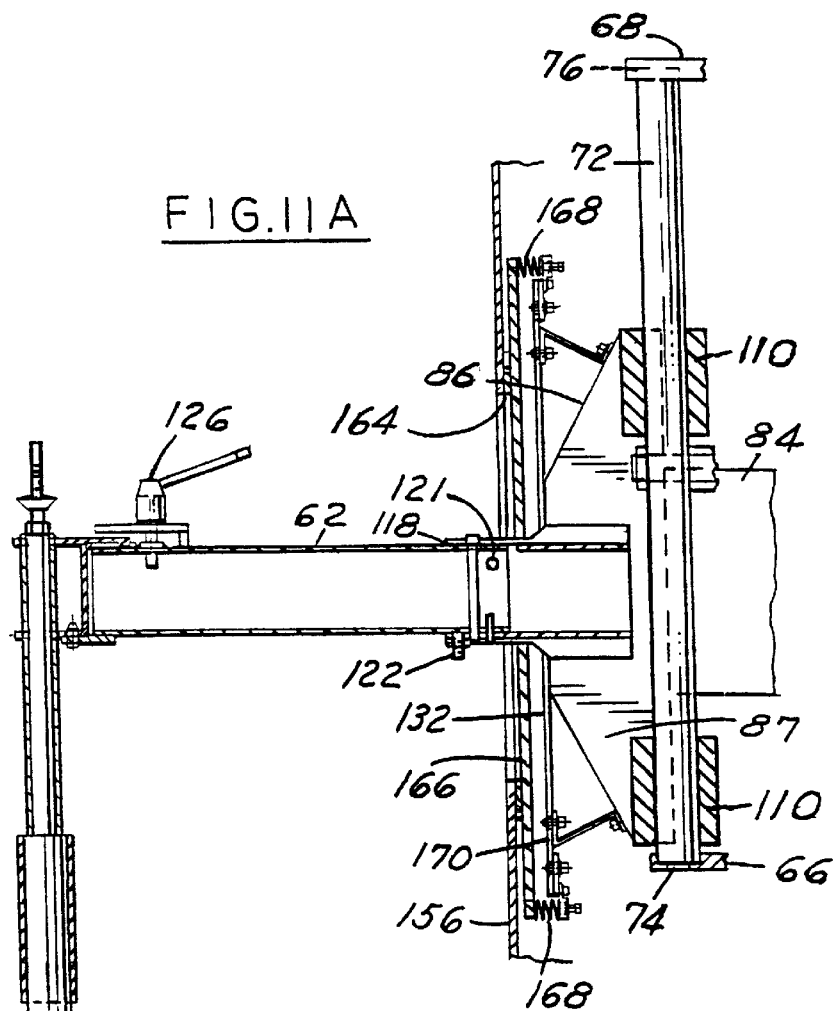
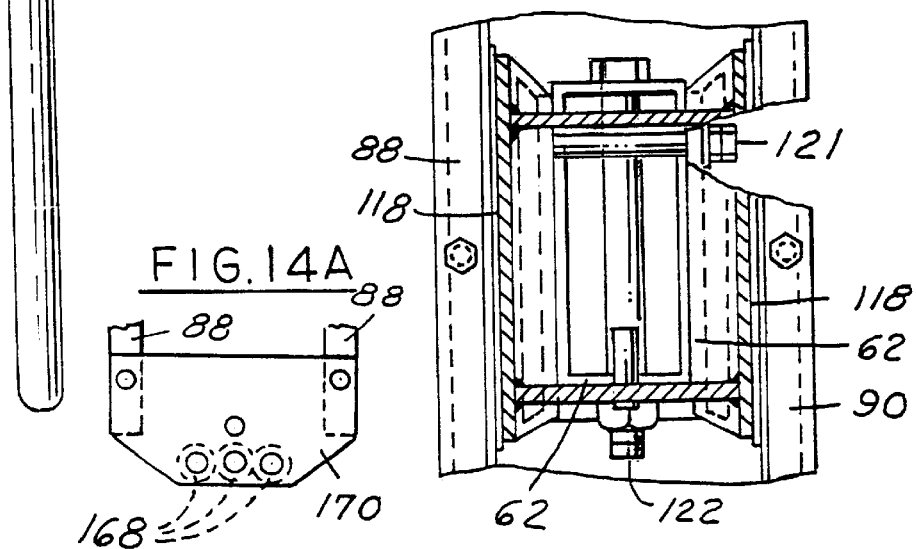

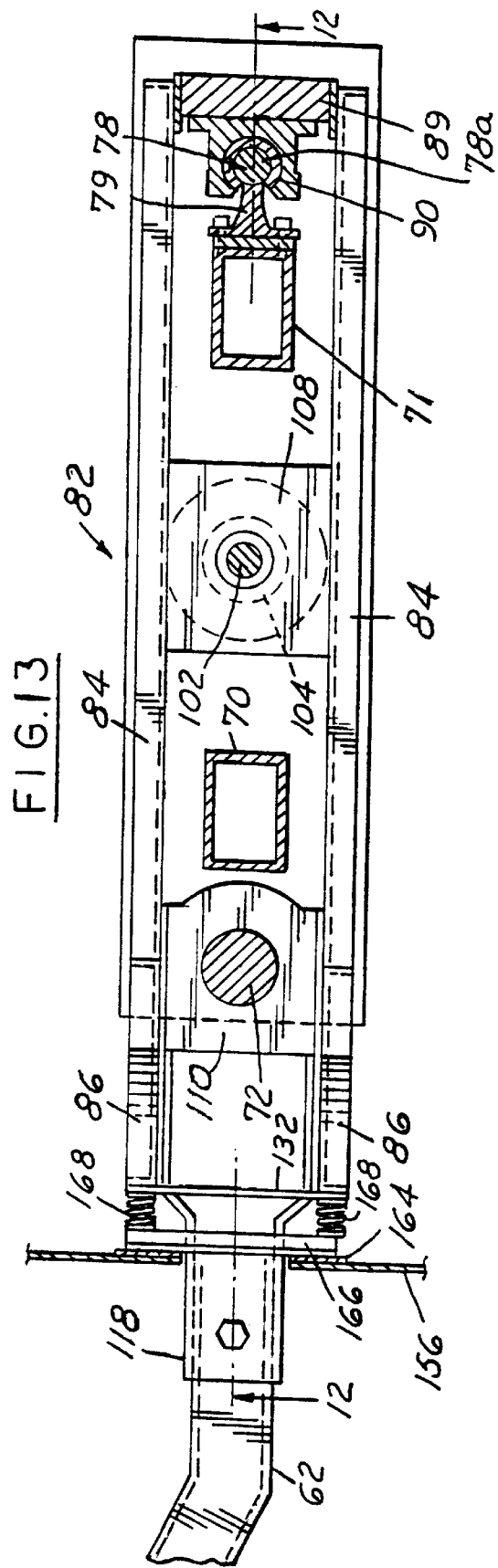

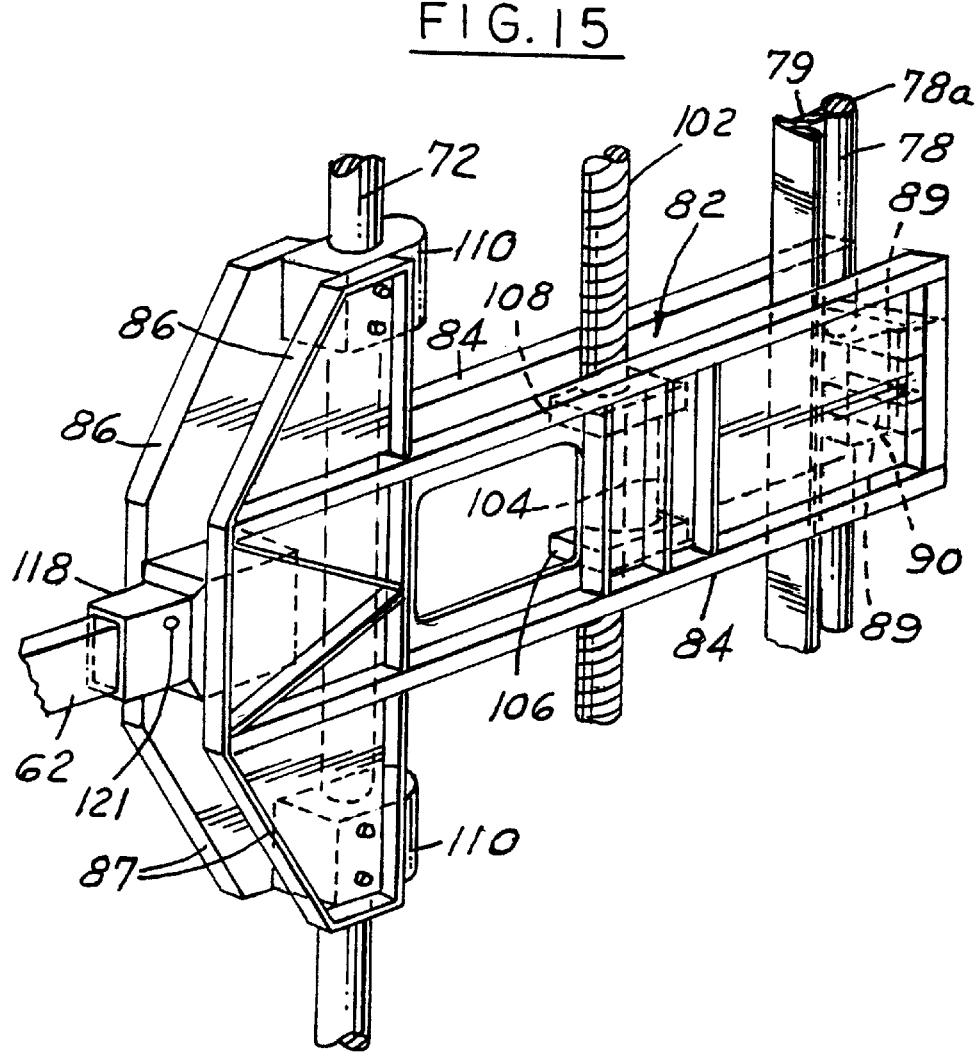

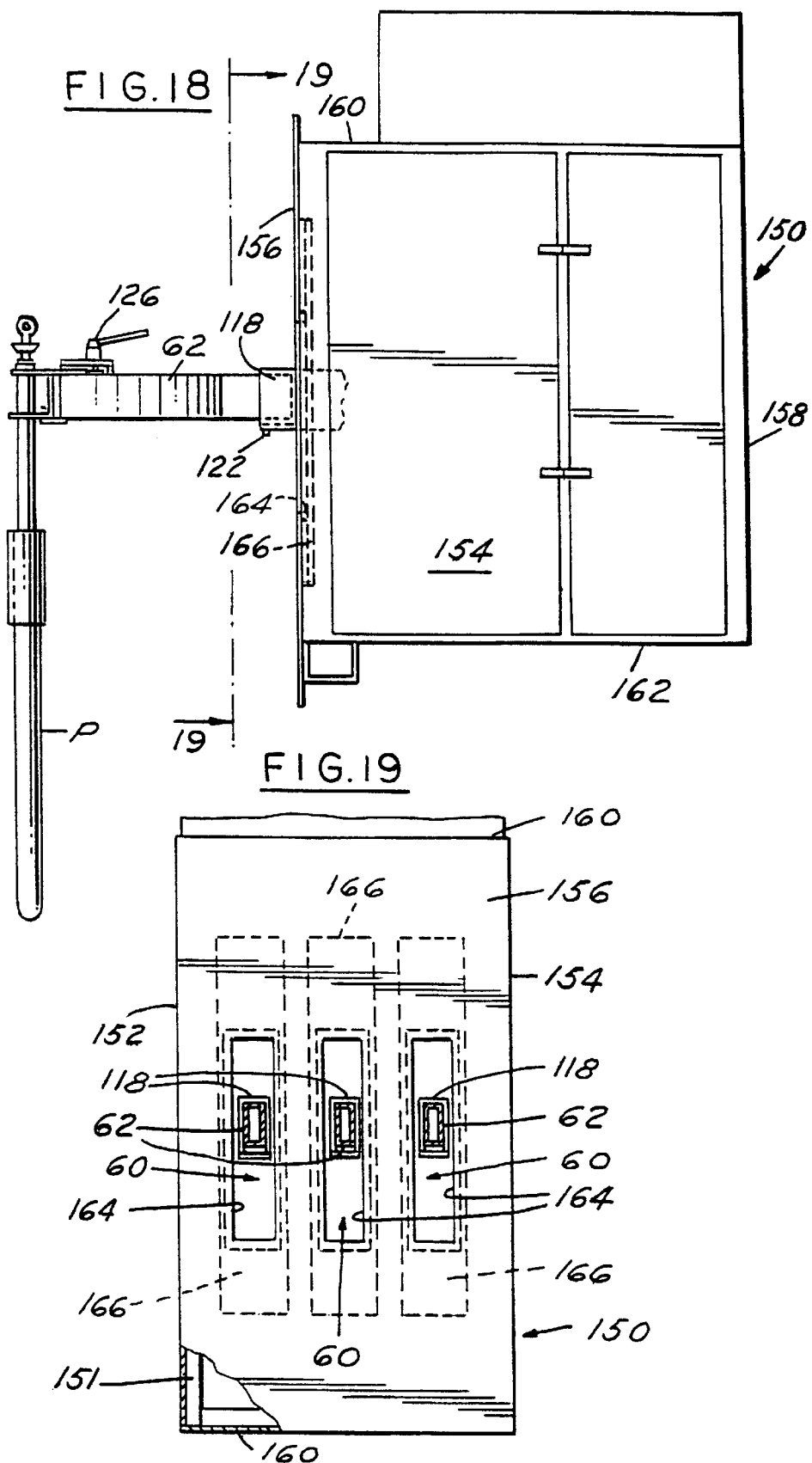

MULTIPLE ORIFICE GLASS FEED SYSTEM

This application is a division of application Ser. No. 09/199,771 filed Nov. 25, 1998, U.S. Pat. No. 6,272,885 which is a continuation of application Ser. No. 08/597,760 filed Feb. 7, 1996 U.S. Pat. No. 5,885,317 which is a continuation-in-part of application Ser. No. 08/228,916 filed Apr. 18, 1994, now abandoned which is a continuation of application Ser. No. 08/022,242 filed Feb. 25, 1993, now abandoned.

This invention relates to multiple orifice feed systems for producing glass gobs.

BACKGROUND AND SUMMARY OF THE INVENTION

In the manufacture of glass articles, it is common to provide a glass forehearth and multiple orifices which are controlled by reciprocable needles or plungers in order to provide the necessary uniform weight of gobs. Plural needles and orifices are utilized in order to maximize glass production.

Typical systems are shown in U.S. Pat. Nos. 1,529,948, 1,792,932, 1,926,764, 3,711,266, 4,478,631, 4,554,000, 4,581,054 and 4,793,849.

In such systems it is common to manually adjust each plunger. Furthermore in such systems, the operating mechanisms are often in overlying relationship to the plungers and therefore are subject to extreme heat conditions and contamination of oil or metal that can jeopardize the purity of the molten glass.

Accordingly among the objectives of the present invention are to provide a multiple orifice glass system wherein each plunger is individually mounted in association with its respective servo-motor; wherein each servo control can be automatically controlled to produce an accurate weight gob during operation; wherein the actuating servo mechanisms are mounted on the side of the forehearth and cannot contaminate the glass and are protected from the heat of the glass; wherein the individual weight of the plunger and support arms is counterbalanced by an air spring; and wherein a single plunger can be consulted, operated and controlled individually.

In accordance with the invention a multiple orifice glass feed system for use with a glass forehearth including a plurality of closely spaced plungers, each of which is individually supported independently of the other. Each plunger includes a servo controlled linear actuator motor and an arm extending between each plunger and its respective servo-motor. Each servo-motor has an axis parallel to the associated axis of the plunger. An air spring is associated with each plunger for balancing the weight of each plunger and its respective arm. The center lines of the plungers lie generally in a plane. Unlike the prior commercial practices which confine the arms to a straight line between the orifice and the motor or actuator, at least some of the arms of the present invention take circuitous routes incorporating parallel and angular portions. A feedback system is provided to monitor the position of each individual needle independently of the others at all times and make corrections to the actual position of the needle if desired.

In one form the center lines of the major portions of the arms are parallel to the plane of the plungers. In another form the center lines of the major portions of the arms are perpendicular to the plane of the plungers. Although the system is especially applicable to a plurality of plungers and is shown as applied to four plungers, it is applicable to a lesser number of plungers or a single plunger.

In another form, each servo-motor is part of a module and moves a movable frame for vertical movement on spaced vertical shafts. Each movable frame supports a plunger arm. The modules are mounted in side by side relationship with one another.

Each assembly of an arm and servo controlled linear actuator motor is preferably provided in an elongated rectangular module such that a plurality of modules can be provided in closely spaced relationship at one side of a forehearth.

DESCRIPTION OF THE DRAWINGS

FIG. 9 is a plan view of a modified form of the invention, parts being broken away.

FIG. 10 is a plan view on an enlarged scale of one of the modules shown in FIG. 9.

FIG. 11A is a fragmentary part sectional side elevational view of portion of the module shown in FIG. 10.

FIG. 13 is a sectional view taken along the line 13—13 in FIG. 12.

FIG. 14 is a fragmentary sectional view on an enlarged scale taken along the line 14—14 in FIG. 12.

FIG. 14A is a fragmentary sectional view on an enlarged scale taken along the line 14A—14A in FIG. 12.

FIG. 15 is a fragmentary perspective view of a portion of the assembly shown in FIG. 12.

FIG. 18 is a view similar to FIG. 16 showing a cabinet surrounding the module.

FIG. 19 is a fragmentary sectional view taken along the line 19—19 in FIG. 18.

DESCRIPTION

Figure 1:
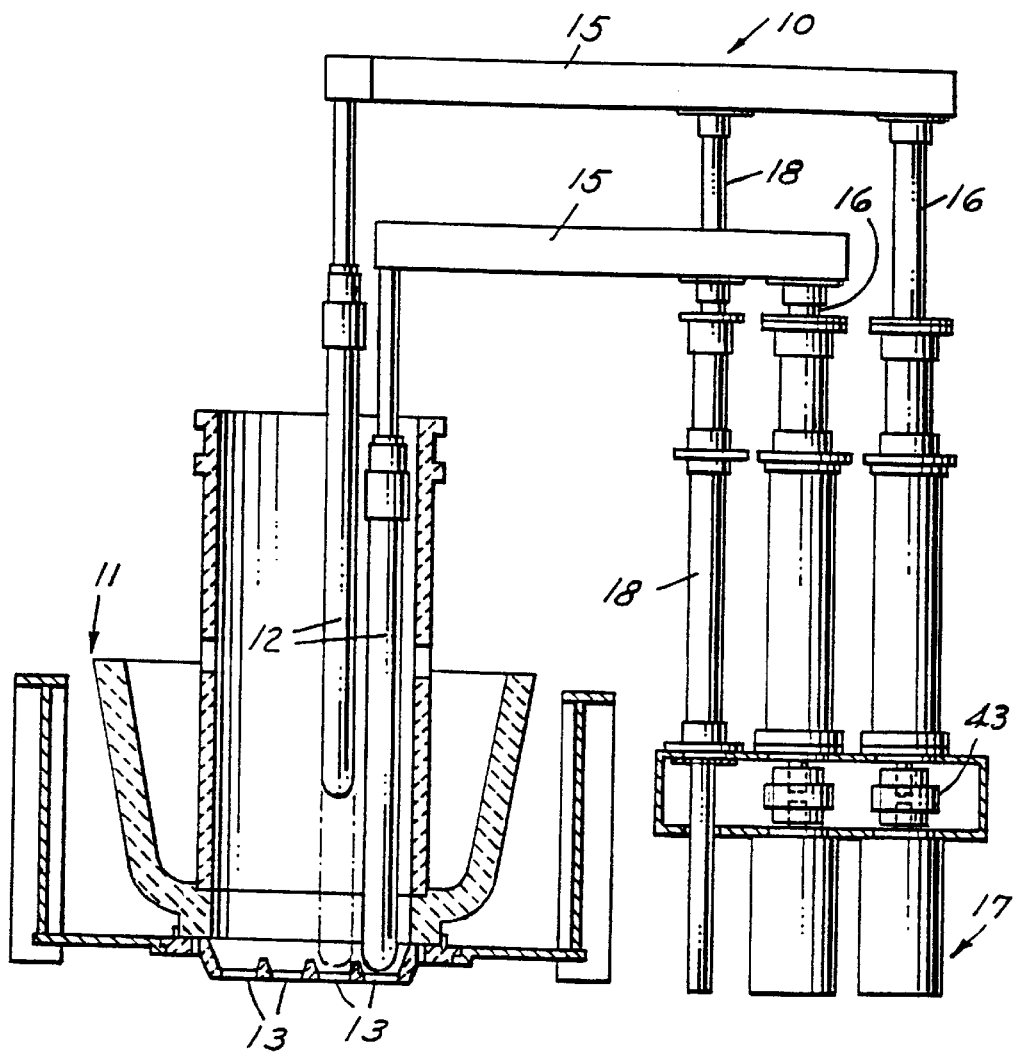
FIG. 1 is a part sectional elevational view of a multiple plunger glass system embodying the invention.
Figure 2:
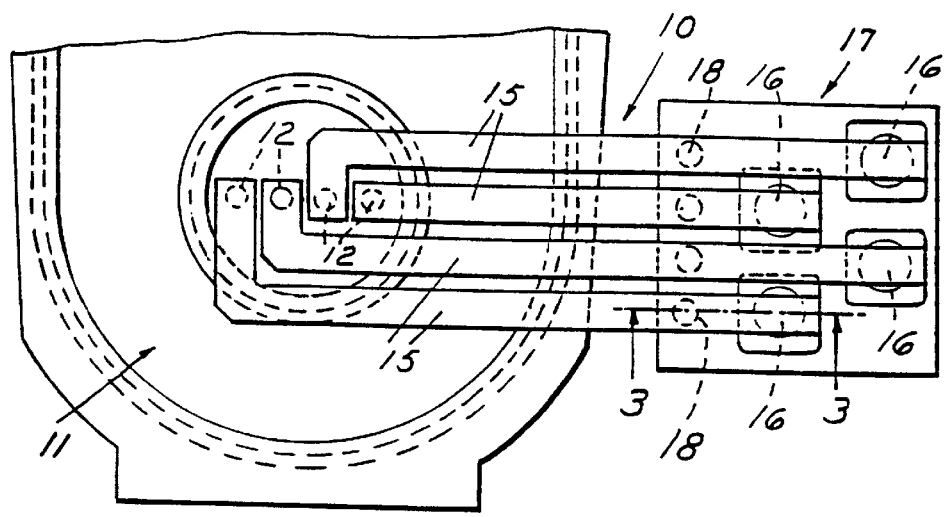
FIG. 2 is a fragmentary plan view of the system.
Figure 4:
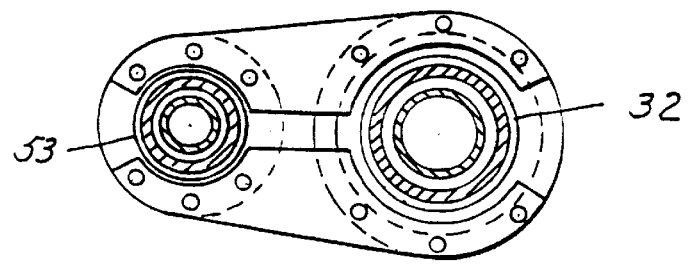
FIG. 4 is a sectional view taken along the line 4—4 in FIG. 3.
Figure 3:
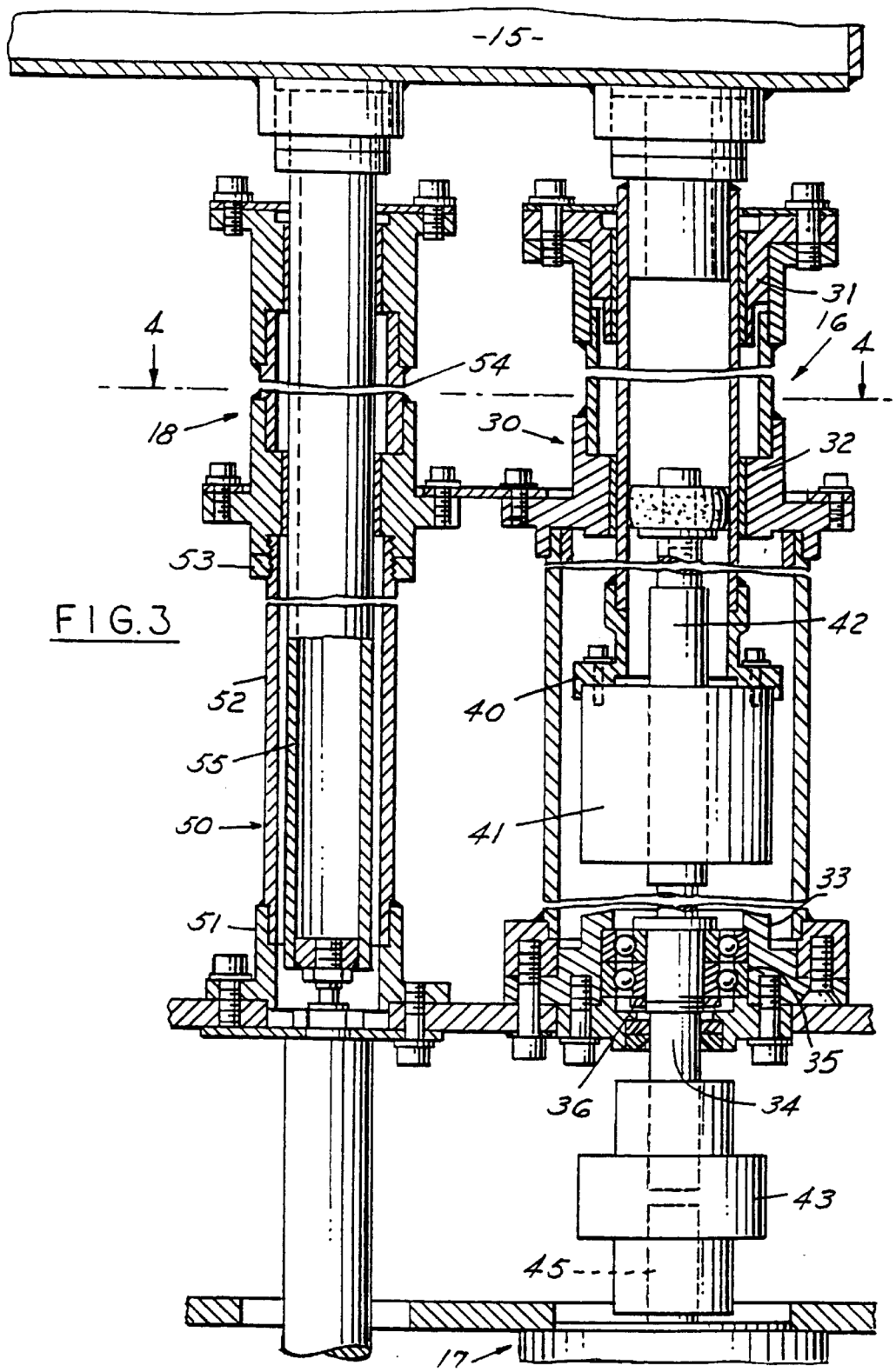
FIG. 3 is a fragmentary sectional view on an enlarged scale taken along the line 3—3 in FIG.2.

Referring to FIGS. 1–3, in accordance with the invention, the glass plunger system 10 embodying the invention is associated with a bowl 11 of a forehearth and is intended to support a plurality of plungers or needles 12 that function in connection with orifices 13 to control the flow of glass out of the orifices so that when associated shears, not shown, are used the size and weight of the gobs is consistent.

In accordance with the invention, each plunger 12 is supported by a horizontal arm 15 that is connected to the plunger 16 of a servo-motor controlled mechanism 17. Each arm further includes an air spring 18 associated with its respective arm 15 for balancing the weight of each plunger and its respective arm. The center lines of the plungers lie generally in a first plane. The arms 15 have the major portions thereof generally parallel and perpendicular to the plane of the plungers (FIG. 3). A feedback system is provided to monitor the position of each individual needle independently of the other at all times and make corrections to the actual position of the needle if desired.

Figure 5:
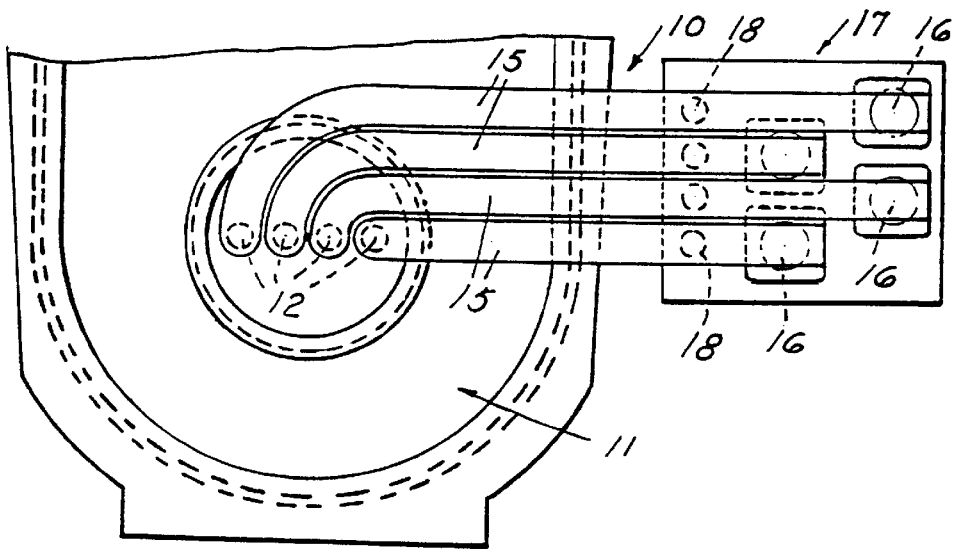
FIG. 5 is a fragmentary plan view of a modified form of glass plunger system.

The arms 15 are constructed and arranged in close proximity so that a minimum of space is utilized and so that the operating mechanisms are in lateral but close proximity to the bowl of the glass. As shown in FIG. 2, one arm 15 is straight and the other three arms are L-shaped, one arm 15 being on one side of straight arm 15 and the other two arms 15 being on the other side of straight arm 15. In the form shown in FIG. 5, all the L-shaped arms are on one side of the straight arm. In both forms, the configuration and size of the L-shaped arms are such that the arms are substantially equidistance from one another throughout their length.

Figure 6:
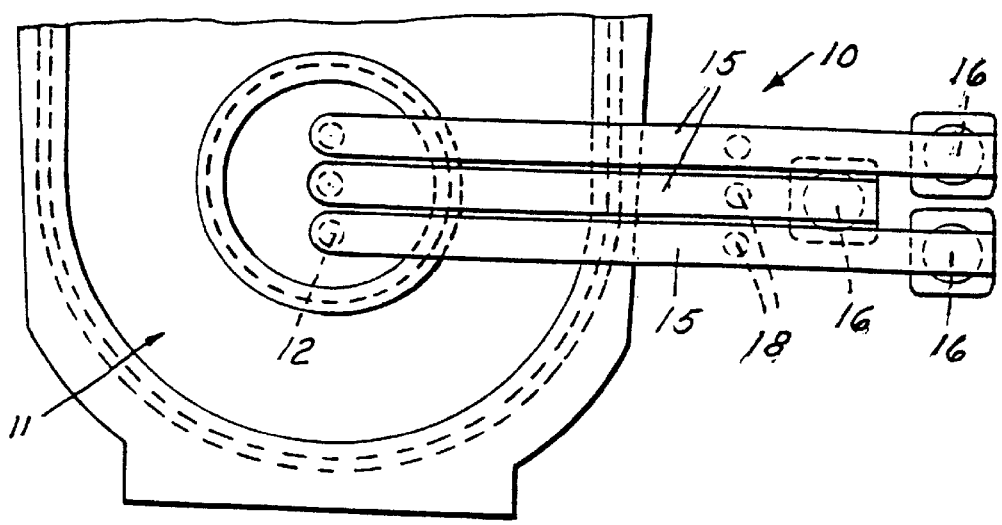
FIG. 6 is a fragmentary plan view of a further form of glass plunger system.

In the form shown in FIG. 2, the arms have their free ends extending at a right angle with the plungers attached thereto with the center lines of the plungers 12 lie in a plane. In the form shown in FIG.5, the ends of the arms are curved to provide the center lines of the plungers 12 in a single plane. In the form shown in FIG. 6, the arms are entirely straight and the center of the plungers are in a plane that is parallel to the plane containing the servo-motors axes.

Referring to FIG. 3, the servo-motor assembly comprises a welded drive housing 30 and includes a top bearing collar 31 an intermediate bearing collar 32 and lower bearing collar 33. A servo drive shaft 34 is rotatably mounted in the collar 33 by a duplex bearing 35 held in position by retaining but 36. A welded drive post assembly 40 is mounted within the housing 30 and supports a planetary roller nut 41. The drive shaft supports a lead screw 42 that is associated with the servo nut 41. A coupling 43 connects the shaft 34 to the shaft of the servo actuator 45. Coupling 43 is preferably of the keyless bushing type which provides a positive lock between servo actuator shaft 45 and drive shaft 34. A keyless bushing allows us the use of the smallest practical shaft diameter 34. The reduced shaft inertia reduces the motor load allowing us to use the latest art of the industry motors 17. Such a coupling is manufactured and sold by Fenner Mannheim, 311 West Stiegel Street, Mannheim, Pa. under the trademark Trantorque.

Each air cylinder 18 that performs the function of an air spring is provided in close relationship to its respective servo-motor assembly and includes a cylinder housing 50 that has a base ring 51, a cylinder housing 52, a jam nut 53 and an upper cylinder weldment 54. An air spring column 55 extends between the shaft of an air spring and a respective arm.

Figure 7:
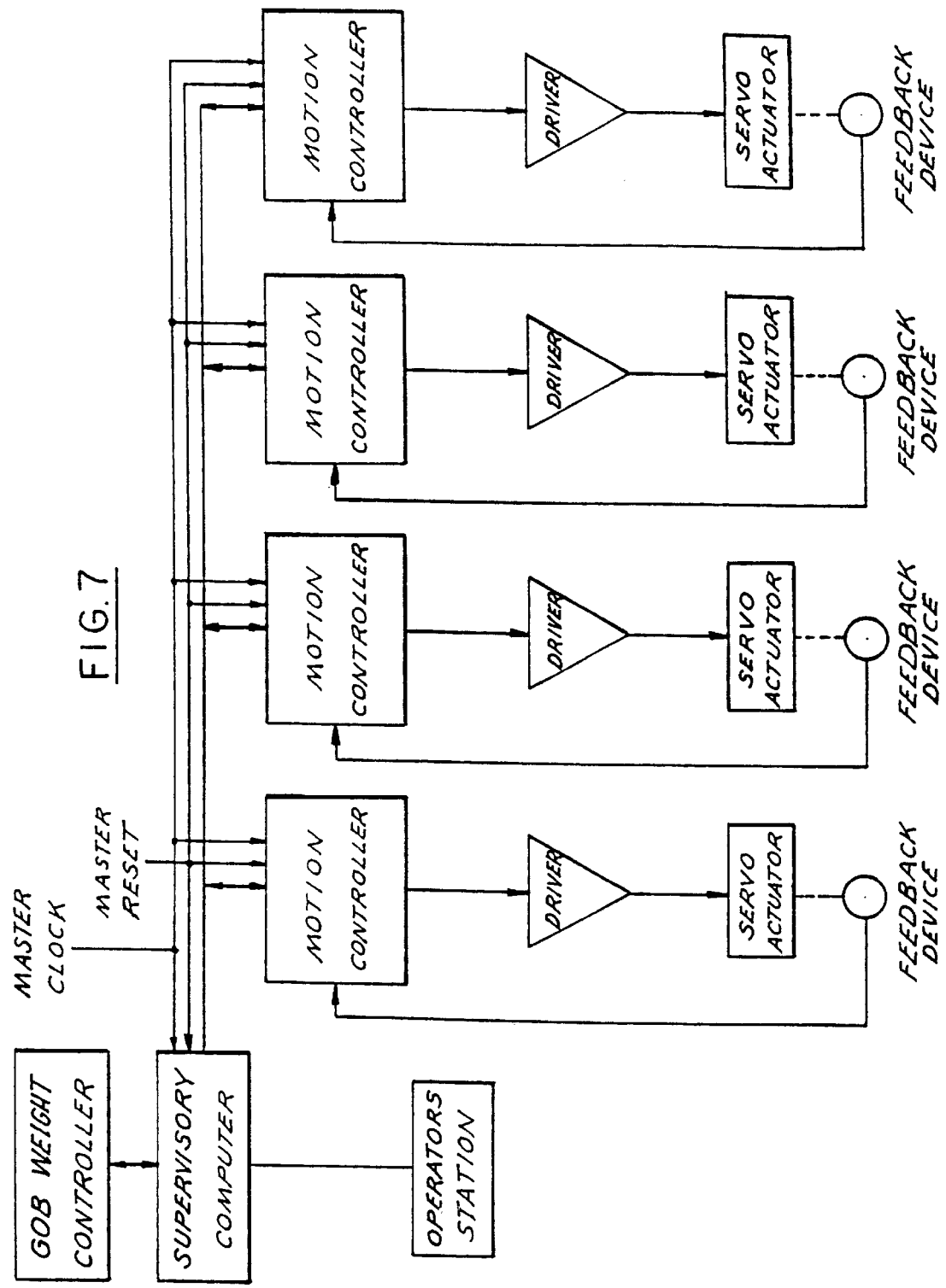
FIG. 7 is an electronic schematic of the control system.

The multiple orifice plunger control system is made up of one to four separate mechanical systems, depending on the number of plungers to move the needles, depending on the number of needles that are present (1–4). Since each needle is a mechanically independent system, a separate control system must be provided for each unit. Referring to FIG. 7, this system consists of the motion controller, amplifier/driver, servo actuator (which in this case, is an AC servo-motor), and a feedback device (resolver) inside the motor housing. At this level each control system is completely independent.

The feedback device is mounted on the back of the servo-motor and serves a dual purpose. It provides position information to the motion controller which is used to determine both the motor rotor position and the position of the plunger.

The rotor position is needed for communication of the motor since it is an AC servo-motor. The position of the plungers, is derived from the resolver, and is a relative offset from a fixed reference.

The fixed reference is the end of travel of the lead screw in the extended position.

The amplifier/driver is simply a power amplifier. It converts the torque command inputs from the associated motor controller to the appropriate voltage and power level for the AC servo-motor connected to it.

The motion controller has in its memory a motion profile, generated by the supervisor, that dictates where the particular needle mechanism should be in relationship to the master clock and reset signals. The actual position of the mechanics is determined from the feedback device (resolver). The motion controller uses both the actual position, the command (profile) position and the rotor position to generate the torque commands that go to the amplifier. The absolute torque command is calculated as a function of the actual and commanded positions. The torque commands that are sent to the amplifier are in a commutated form for a phase A and B. The amplitude of the absolute torque command for motor phases A and B is adjusted based on the motor rotor position. The torque command for phase C is calculated in the amplifier, it is the sum of the torque command of A and B.

Figure 8:
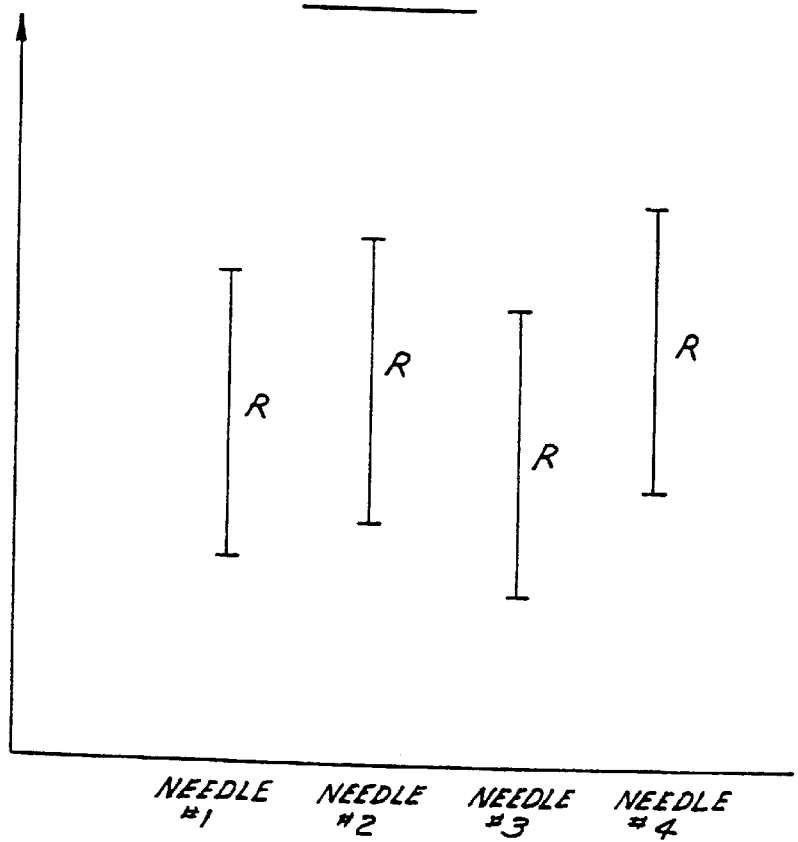
FIG. 8 is a diagram of the range of motion of a plurality of plungers.

The supervisor calculates the motion profile for each of the motion controllers based on input from the user. The profile is a position-to-position relationship between a master clock and the desired position of each needle. The same profile is normally used for each needle, but a unique profile for each needle is possible if the situation demands it. The needles are normally synchronized to operate at the same time, reaching the extremes of their motion at the same point in time. The vertical distance is normally the same also. Because of glass flow differences between the orifices, the needle typically operates at different elevations as shown in FIG. 8. This difference in height is used to balance the weight of the gobs produced by the individual orifices. The height adjustment is controlled by the supervisor. If a change in the height relationship between the needles in commanded, by either operator input or from an automatic gob weight control system, the motion profile for the effected needle or needles is recalculated by the supervisor. The profile is then written into the memory of the motion controller. The supervisor is then responsible for synchronizing the change to the new profile so that all the effected motion controllers switch at the same time without a disruption of production.

It can thus be seen that there has been provided a multiple orifice glass system wherein each plunger is individually mounted in association with its respective servo-motor; wherein each servo control can be automatically controlled to produce an accurate weight gob during operation; wherein the actuating servo mechanisms are mounted on the side of the forehearth and cannot contaminate the glass and are protected from the heat of the glass; wherein the individual weight of the plunger and support arms is counterbalanced by an air spring; and wherein a single plunger can be consulted, operated and controlled individually.

In the modified forms of the invention shown in FIGS. 9–23, the servo-motors are part of compact modules 60 which are mounted in a closely spaced side by side relation adjacent the forehearth. Each module 60 supports a horizontal plunger arm 62 and a plunger or needle P.

In the form shown in FIG. 9, the plane of the vertical center lines of the plungers is parallel to the axis of the forehearth F.

Referring to FIGS. 10–17, each module 60 consists of a fixed frame 64 (FIG. 11) that includes a rectangular bottom plate 66, a rectangular top plate 68 and spaced vertical uprights 70, 71 connected to the plates 66, 68 by bolts. A first shaft 72 extends between the plates 66, 68 and has its ends extending into recesses 74,76. A second shaft 78 comprises a cylindrical bearing portion 78a and an integral elongated portion 79 along the cylindrical portion 78a which is bolted to the uprights 71. Shaft 78 extends upwardly from bottom plate 66.

A movable frame 82 is supported for vertical movement on the shafts 72, 78 and consists of a spaced vertical frame members 84 (FIGS. 13, 15), each of which includes upwardly extending frame extensions 86 and downwardly extending frame extensions 87 at one end adjacent the plunger arm 62. Frame extension 86, 87 support vertically spaced bearings 110 (FIG. 12) for shaft 72. Transverse bars 89 at the other end of frame 82 extend between the frame members 84 and support a bearing 90 for shaft 78. A servo-motor 92 is preferably formed with vertical fins 94 (FIG. 11) on its housing to maximize cooling of the motor during operation where the mechanism is exposed to the high heat of the forehearth. The servo-motor 92 (FIG. 11) includes an output shaft 96 that extends through a brake 98 through upper plate 68 between the uprights 70 to a coupling 100 (FIG. 12) that is connected to a vertical lead screw 102. The upper end of the lead screw 102 is rotatably supported by a bearing 101 that, in turn, is supported by a bearing housing 103 fixed between uprights 70, 71. The lower end of the vertical lead screw 102, extends through a planetary helical roller nut 104. The nut 104 is mounted on plates 106, 108 between side plates frame members 84 (FIG. 13) such that when the lead screw 102 is rotated the nut 104 is translated vertically (FIG. 15) and moves the frame 82 (FIGS. 13, 15) consisting of member 84, 86, 87 and plunger arm 62 vertically.

Shaft 72 extends through the bearings 110 and thus assists in vertically guiding the movable frame 82 and also counteracts the weight of the plunger arm 62 and plunger P. A bearing 90 is mounted at the other end of the movable frame 82 assists in the guiding of the vertical movement of the frame 82 as well as counterbalancing the forces due to weight of the plunger P and plunger arm 62. An adjustable stop 116 is provided on the lower plate 66 and functions as a stop for the nut 104 in the event the movable frame 82 is moved downwardly to a position which might damage the forehearth F.

Figure 11:
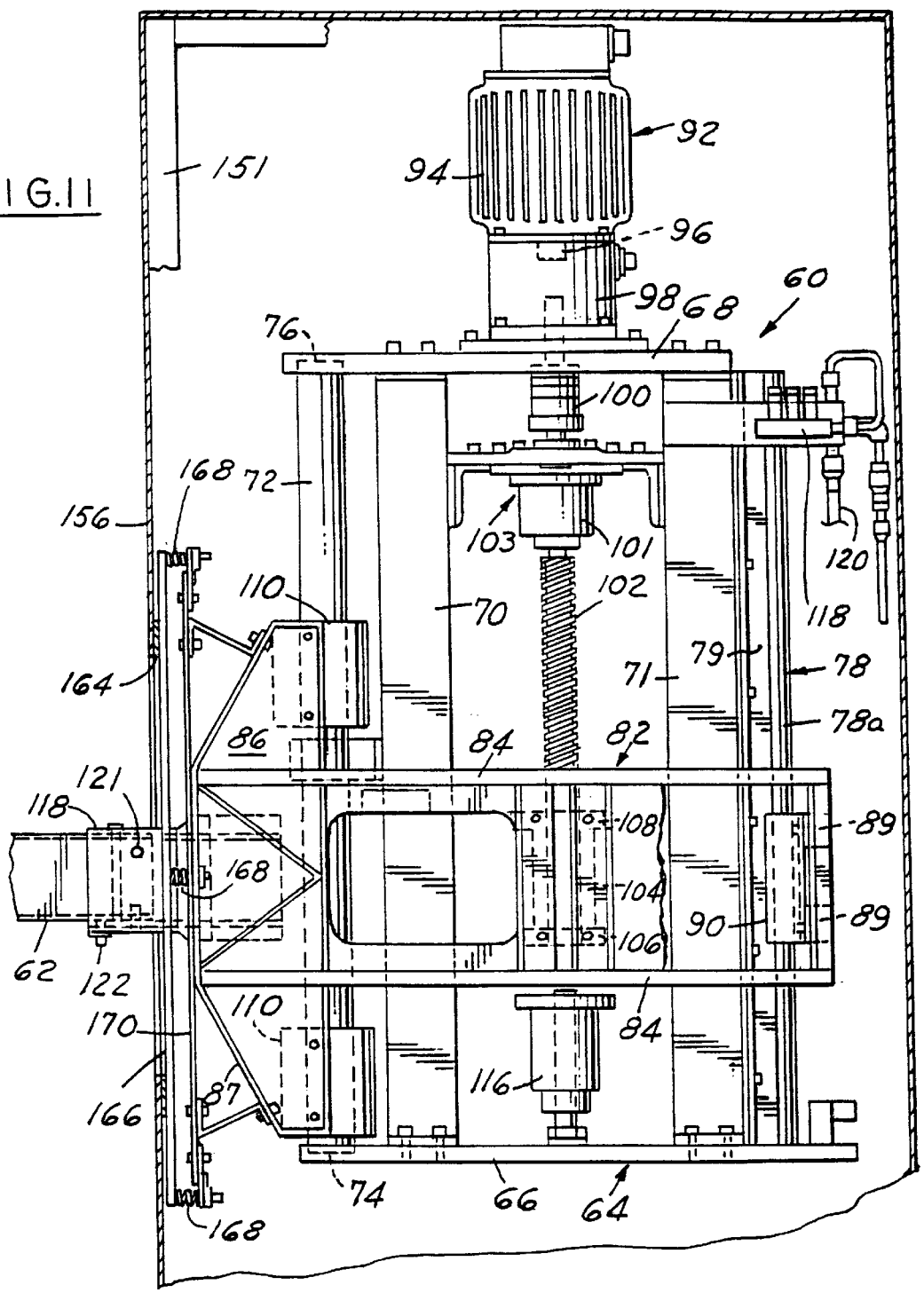
FIG. 11 is a side elevational view of the module shown in FIG. 10, parts being broken away.
Figure 12:
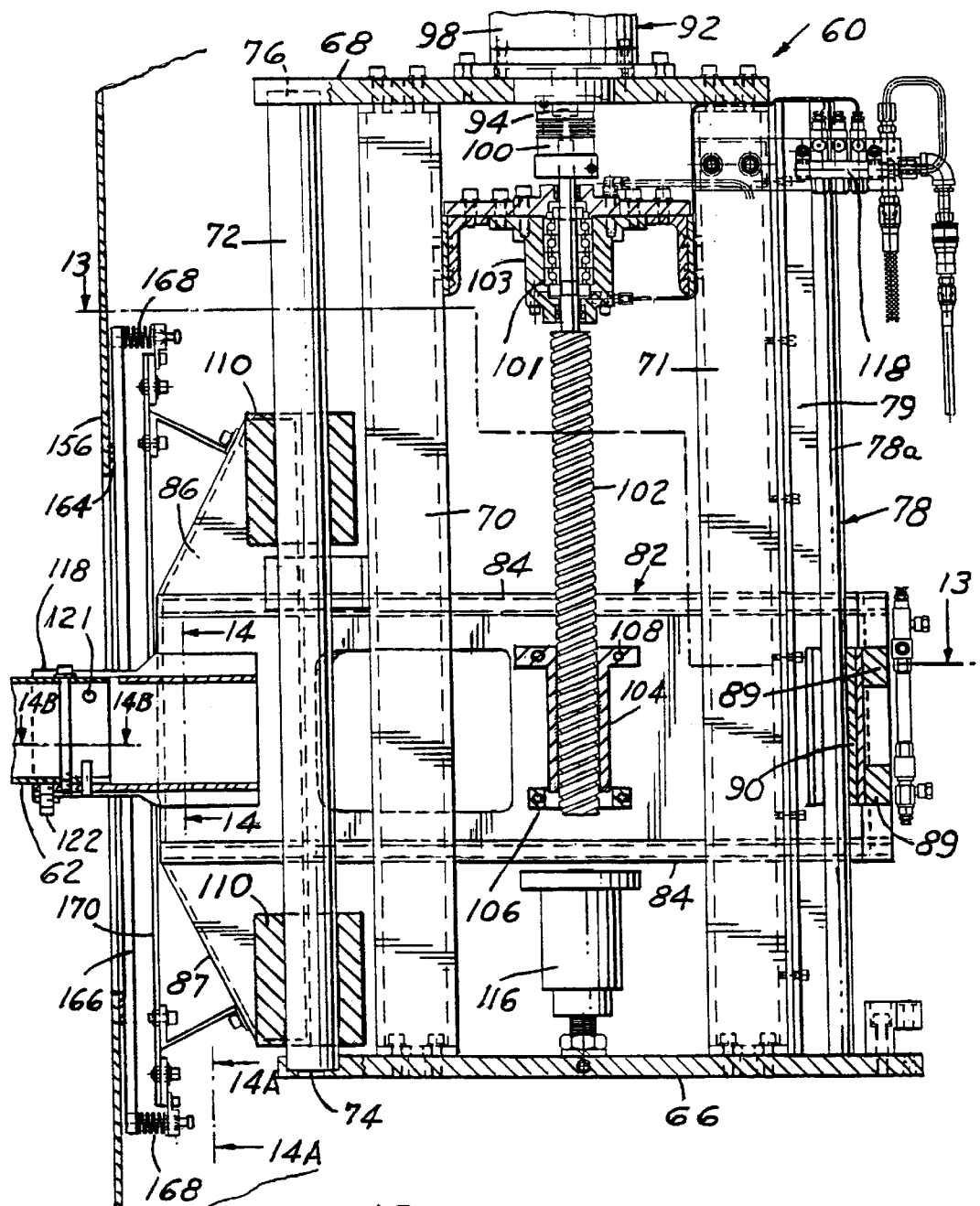
FIG. 12 is a sectional view taken along the line 12—12 in FIG. 10.

As shown in FIG. 11, a manifold 118 with associated hoses as provided for supplying lubricant to the bearings 90, 101, 110 and ball roller nut 104, through line 120.

Figure 14B:
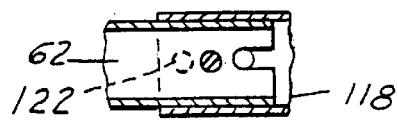
FIG. 14B is a fragmentary sectional view taken along the line 14B—14B in FIG. 12.
Figure 16:
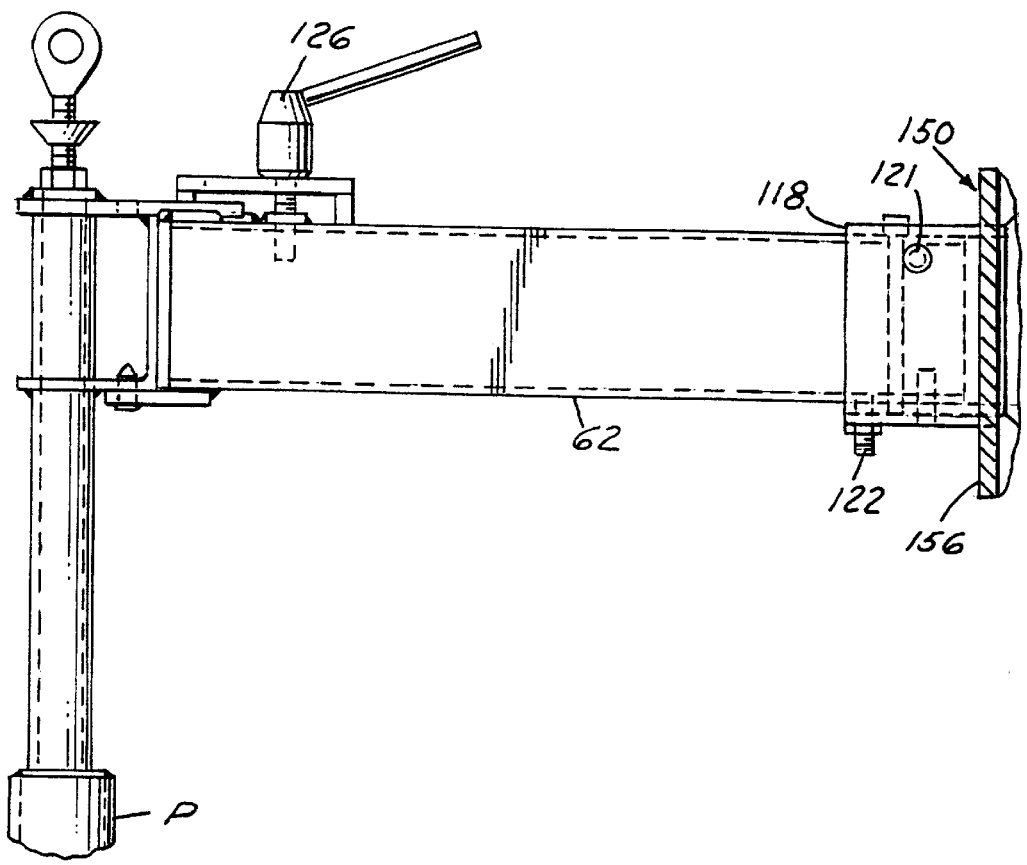
FIG. 16 is a fragmentary view of a plunger and arm.
Figure 17:
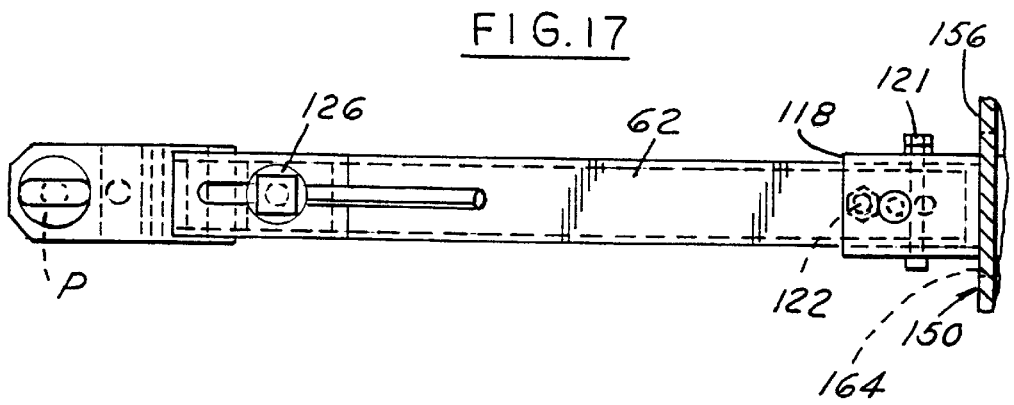
FIG. 17 is a top plan view of the plunger and arm shown in FIG. 16.

Referring to FIGS. 11A and 13–15 a coupling 118 which is rectangular in cross section is mounted between the frame members 84 and telescopically receives a plunger arm 62. As shown in FIGS. 14, and 14A, the plunger arm 62 is pivoted to the coupling 118 by a bolt 121 such that the plunger arm 62 can be tilted upwardly out of the way for service on the forehearth F. An adjustable stop 122 is provided on a plate 66 for adjusting horizontal position of the plunger arm to ensure proper vertical movement of the plunger P. The plunger P is preferably coupled to the plunger arm 62 by quick release lock 126.

Referring to FIGS. 11, 18, 19, a shield housing or cabinet 150 is preferably provided around the modules 60 to protect the modules 60 from the heat of the forehearth in a manner in which the arms 62 extends outwardly from the cabinet. The cabinet 150 includes a frame 151 on which side walls 152, 154, end walls 156, 158 and top and bottom walls 160, 162 are removable. The end wall 156 has vertically elongated openings 164 through which the arms 62 extend.

A heat shield 166 is provided forwardly on each module 60 and moves with the module 60 as the movable frame 82 and associated arm 62 is moved up and down and is spring loaded by springs 168 on a fixed plate 170 for sealing engagement with the opening of wall 156 in order to protect the modules 60 from the high heat of the glass and the forehearth.

In operation the servo-motor 92 is actuated to move its respected plunger P. Each module 60 is independent of the other as in the previous form of the invention and is controlled individually as in the previous form of the invention.

In the arrangement shown in FIG. 9, the vertical axes of the plungers lie in a plane parallel to the axis of the forehearth F. The plunger arms 62a, 62b and 62c each have straight and parallel end portions. The center module 60 has the entire arm 62b straight, while the arms 62a and 62c have the major central portions at a small angle to the arm 62b such as to bring the plungers thereon into the vertical plane previously described.

Figure 20:
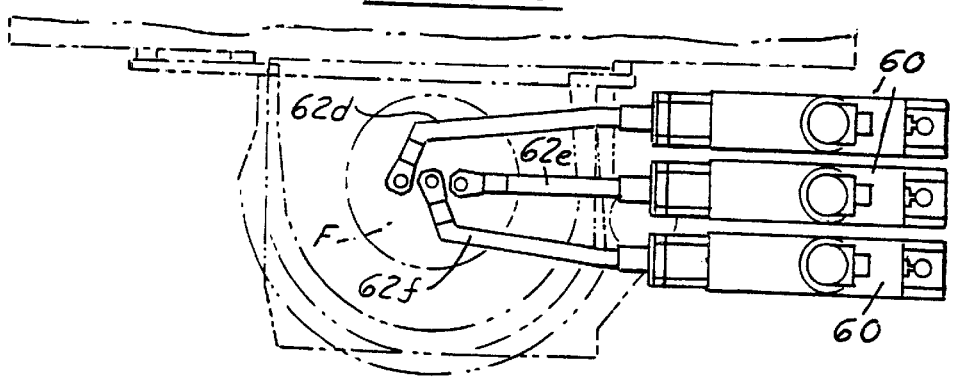
FIG. 20 is a plan view of another modified form of the invention.

In another arrangement as shown in FIG. 20 the plane of the plungers, that is the plane containing the vertical axes of the plungers, is perpendicular of the axis of the forehearth F. In order to achieve such an arrangement, the center plunger arm 62e is straight and the others arms 62d and 62f have their central major portions at a small angle to the straight arm 62e and have their end potions which are connected to the plungers at an obtuse angle to the central portions in order to bring the plungers into the single plane.

Figure 21:
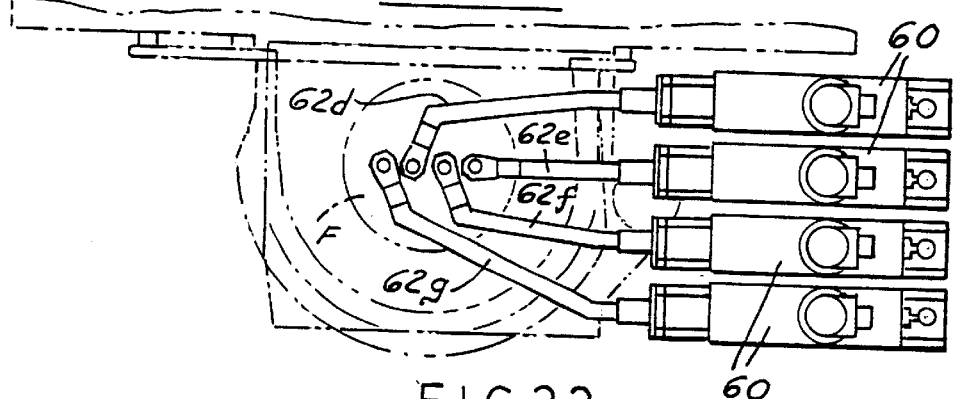
FIG. 21 is a plan view of another modified form of the invention.

The arrangement shown in FIG. 21 is similar to that shown in FIG. 20 except that four plungers are shown in a single plane. In order to achieve this arrangement the additional plunger arm 62g of the fourth module 60 has an end portion that is straight and coupled to the fourth module 60. Plunger arm 62g has a central portion that it at a greater angle than arms 62d and 62f to the straight end portion which is connected to the fourth module. The other end of arm 62g angled to present the fourth plunger into the desired position.

Figure 22:
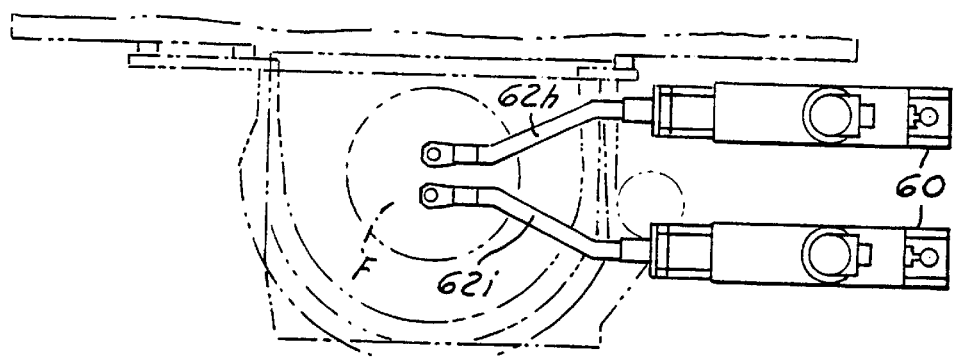
FIG. 22 is a plan view of a still further form of the invention.

In the form shown in FIG. 22, two plungers are provided by respective module 60.

Each plunger arm 62h, 62i has straight end portions and angled major central portions such that the plane containing the vertical axes of the plungers is parallel to the axis of forehearth F.

Figure 23:
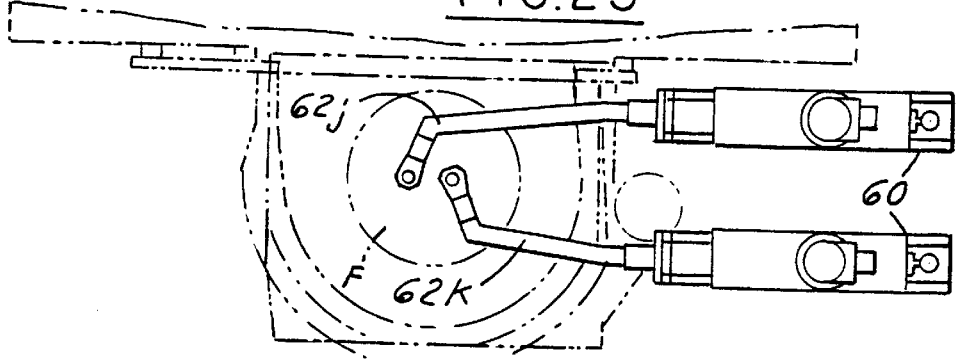
FIG. 23 is a plan view of another form of the invention.

In the form shown in FIG. 23, the plane defined by the axes of the plungers is at a right angle to the axis of the forehearth. In order to achieve this the plunger arms 62j, 62k have straight portions connected to the module 60, major central portions inclined to the ends at the one end and end portions connected to the plungers which are at a greater angle to the central portions angled at the other end.

It can be seen that in each of the forms shown in FIGS. 9–23, the modules are rectangular as viewed in plan view and have a length several times the width so that the modules are very compacted and occupy minimal space. As a result, they can be closely spaced on one side of the forehearth as shown in FIGS. 9, 20–23, thus leaving room for the tube turning mechanism, gas burners, and shear mechanisms, while at the same time permitting ambient air to cool and thereby protect the mechanisms of the modules.

It can be further seen that in all the forms of the invention, at least some of the arms are circuitous as viewed in plan view between the connection to the respective plungers and the connection to respective servo controlled linear actuators. In other words, each circuitous arm does not lie in a straight line between the connection to the plunger and the connection to the servo controlled actuators. As a result, the use of circuitous arms and the compact configuration of the actuators as viewed in plan view enable the actuators and arms to be in closely spaced relationship in a relatively small area such that the remaining area of the forehearth will be available for the numerous mechanisms used for glass delivery.

What is claimed is:

1. An apparatus for controlling flow of glass through a plurality of discharge orifices lying in a single vertical plane in a glass forehearth, said apparatus comprising:
    a plurality of closely spaced plungers adapted to be associated with said orifices,
    each said plunger having a vertical axis,
    said vertical axes of said plungers lying in a single plane,
    a plurality of closely spaced arms,
    each said arm having opposed ends and an intermediate portion between said ends,
    a plurality of independently operable servo controlled linear actuators,
    said actuators being closely spaced from one another and mounted on one side of said forehearth,
    one of said ends of each said arm being connected to an associated one of said plungers,
    the other end of each said arm being connected to an associated servo controlled actuator, and
    at least one of said arms being configured such that, as viewed from a vertical direction, said one end connected to said plunger is at an angle to the intermediate portion of said at least one arm.

2. The apparatus set forth in claim 1, including a plurality of air springs, each connected to a respective arm for balancing the weight of the plunger connected to such arm.

3. The apparatus set forth in claim 1, wherein at least some of said arms have configurations comprising portions that are parallel to each other throughout movement of said arms, and angular portions between the ends of said arms.

4. The apparatus set forth in claim 1, wherein said intermediate portions of said arms are the greatest portions of the lengths of said arms between said ends, and which intermediate portions are parallel to each other throughout movement of said arms.

5. The apparatus set forth in claim 4, including at least three of said arms, one of said arms being straight, the others of said arms having major length portions that are parallel to said straight arm, the others of said arms each having said one end such that the plane of said plungers on said arms is parallel to said straight arm and the major length portions of said other arms.

6. The apparatus set forth in claim 4, wherein each arm has a major length portion and a minor length portion, the minor length portion of each arm being at a right angle to the major length portion of that arm, and the major length portions of the arms being parallel to said plane of said plungers.

7. The apparatus set forth in claim 1, including a plurality of fixed frames, a plurality of movable frames, a pair of spaced shafts on each said fixed frame for guiding an associated movable frame vertically of the fixed frame, each said plunger arm being mounted to an associated movable frame, each said servo actuator being mounted on an associated fixed frame, and means operatively connecting each movable frame to said servo actuator on the associated fixed frame.

8. The apparatus set forth in claim 7 wherein said means connecting said servo actuator to said movable frame comprises a lead screw mounted on said fixed frame and coupled to said servo actuator, and a nut threaded on said lead screw and coupled to said movable frame.

9. The apparatus set forth in claim 1, including a motion control system for each said servo controlled linear actuator, each motion control system being controllable independently of the other motion control systems, each said servo controlled linear actuator including a servo motor.

10. The apparatus set forth in claim 9, wherein each said motion control system is responsive to actual position of the associated plunger and includes means for comparing said actual position of said plunger to a desired value to generate a motor torque signal for said motor.

11. The apparatus set forth in claim 10, wherein each motion control system includes means for electrically adjusting the vertical position of the respective arm and plunger, vertical positions of said arms and plungers being electrically adjustable independently of each other.

12. The apparatus set forth in claim 10, wherein each said motion control system has a memory for storing a motion profile for the associated servo controlled linear actuator and plunger.

13. The apparatus set forth in claim 12, wherein said motion control systems are connected to means for electronically synchronizing operation of said independently operable servo controlled linear actuators.

14. A method for controlling flow of glass through a plurality of discharge orifices lying in a single vertical plane in a glass forehearth, which comprises the steps of:
    (a) providing a plurality of closely spaced plungers adapted to be associated with said orifices, with each said plunger having a vertical axis,
    (b) positioning said vertical axes of said plungers such that they lie in said single vertical plane,
    (c) providing a plurality of closely spaced arms, each said arm having opposed ends,
    (d) connecting one of said ends of each said arm to one of said plungers,
    (e) providing a plurality of independently operable servo controlled linear actuators in closely spaced relationship on one side of said forehearth,
    (f) connecting an other end of each said arm to a servo controlled actuator such that said arms are movable by said servo controlled actuators independently of each other, and
    (g) configuring at least one of said arms such that, as viewed from a vertical direction, an end portion of said one arm lies at an angle to an intermediate portion of said one arm.

15. The method set forth in claim 14, comprising the additional steps of:

(h) providing a motor control system for each servo controlled linear actuator, each motor control system being independent of the other control systems, (i) sensing actual position of each respective plunger, (j) comparing said actual position of each plunger to a desired value and to the position of its associated servo controlled linear actuator, and (k) generating a motor torque signal in response to said position comparison.

16. In combination with a glass forehearth having a plurality of spaced discharge orifices lying in a vertical plane, an apparatus for controlling flow of glass through said orifices, said apparatus comprising:

a plurality of spaced vertical plungers at a spacing from each other equal to spacing of said discharge orifices from each other and having axes lying in said vertical plane with said orifices, each said plunger being movable linearly along its vertical axis, a plurality of at least three spaced arms each having one end from which an associated one of said plungers is suspended and an other end, a first of said three arms being straight, and second and third of said at least three arms having major length portions parallel to said straight arm, said second and third arms each having a curved end from which the associated plunger is suspended, a plurality of independently operable servo controlled linear actuators mounted adjacent to each other on one side of said forehearth for movement linearly in directions parallel to said axes of said plungers, each said arm being connected at its other end to one of said servo controlled actuators in such a way that each said arm is at a fixed angle to the axis of the associated plunger as viewed from a horizontal direction and remains at said fixed angle throughout movement of said actuators and said plungers, and a plurality of motion control systems each coupled to one of said servo controlled linear actuators, each said motion control system and servo controlled linear actuator coupled thereto being independently controllable with respect to the other motion control systems and servo controlled linear actuators, and each said arm being movable independently of the other arms.

\* \* \* \* \*